(12) United States Patent
Liang et al.

(10) Patent No.: US 10,379,433 B2
(45) Date of Patent: Aug. 13, 2019

(54) PROJECTOR AND RELATED METHOD FOR PROJECTING A LIGHT BEAM

(71) Applicant: QISDA CORPORATION, Taoyuan (TW)

(72) Inventors: Li-Wei Liang, Taoyuan (TW); Chih-Wei Cho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 34 days.

(21) Appl. No.: 15/719,580

(22) Filed: Sep. 29, 2017

(65) Prior Publication Data

US 2018/0095352 A1    Apr. 5, 2018

(30) Foreign Application Priority Data

Sep. 30, 2016  (CN) .......................... 2016 1 0866183
Sep. 30, 2016  (CN) .......................... 2016 1 0871558

(51) Int. Cl.
*G03B 21/00* (2006.01)
*G03B 21/20* (2006.01)
*G03B 33/08* (2006.01)

(52) U.S. Cl.
CPC ....... *G03B 21/2053* (2013.01); *G03B 21/008* (2013.01); *G03B 21/204* (2013.01); *G03B 33/08* (2013.01)

(58) Field of Classification Search
None
See application file for complete search history.

(56) References Cited

U.S. PATENT DOCUMENTS

| 7,161,608 | B2 * | 1/2007 | Pettitt | G09G 3/2081 345/690 |
| RE41,429 | E * | 7/2010 | Yen | G11B 7/1267 369/47.15 |
| 8,149,252 | B2 * | 4/2012 | Clatanoff | G09G 3/346 345/108 |
| 8,362,707 | B2 * | 1/2013 | Draper | H05B 33/0872 315/149 |
| 8,444,275 | B2 * | 5/2013 | Kurtz | H04N 9/3105 353/85 |
| 8,723,895 | B2 * | 5/2014 | Chen | G03B 21/2013 345/690 |
| 9,146,452 | B2 * | 9/2015 | Guthrie | F21V 9/40 |
| 9,769,899 | B2 * | 9/2017 | Ho | H05B 33/0851 |

(Continued)

FOREIGN PATENT DOCUMENTS

| CN | 102300101 A | 12/2011 |
| CN | 102314056 A | 1/2012 |
| CN | 102650813 B | 2/2015 |

OTHER PUBLICATIONS

EIC search report; 2018.*

*Primary Examiner* — Dion Ferguson
*Assistant Examiner* — Srinivas Sathiraju (57) ABSTRACT

A projector has a light source, a phosphor wheel, a digital mirror device (DMD) and a control unit. The phosphor wheel has a plurality of color sections. The light source projects a light source beam with a specific intensity onto a specific color section of the phosphor wheel when the DMD is operated at a specific duty cycle. By adjusting at least one of the specific duty cycle and the specific intensity, the control unit can adjust real brightness to approach specific target brightness of the specific color section so as to optimize white balance of the projector.

25 Claims, 9 Drawing Sheets

(56) References Cited

U.S. PATENT DOCUMENTS

| | | | |
|---|---|---|---|
| 9,900,957 B2* | 2/2018 | van de Ven | F21V 29/74 |
| 2005/0146541 A1* | 7/2005 | Pettitt | G09G 3/2081 |
| | | | 345/698 |
| 2005/0174473 A1* | 8/2005 | Morgan | H05B 33/0803 |
| | | | 348/370 |
| 2009/0289967 A1* | 11/2009 | Clatanoff | G09G 3/346 |
| | | | 345/691 |
| 2010/0079365 A1* | 4/2010 | Feng | G09G 3/3413 |
| | | | 345/102 |
| 2011/0211333 A1* | 9/2011 | Bartlett | G03B 21/204 |
| | | | 362/84 |
| 2012/0038892 A1* | 2/2012 | Kurtz | H04N 9/3105 |
| | | | 353/31 |
| 2013/0002728 A1* | 1/2013 | Clatanoff | G09G 3/346 |
| | | | 345/690 |
| 2014/0204558 A1* | 7/2014 | Bartlett | G02B 26/008 |
| | | | 362/84 |
| 2014/0268066 A1* | 9/2014 | Guthrie | F21V 9/40 |
| | | | 353/31 |
| 2018/0095352 A1* | 4/2018 | Liang | G03B 21/008 |
| 2018/0136552 A1* | 5/2018 | Kobayashi | H05B 37/02 |

* cited by examiner

| Color subsection / Intensity | $A_1$ | $A_2$ | ... | $A_n$ | $B_1$ | $B_2$ | ... | $B_n$ | $C_1$ | $C_2$ | ... | $C_n$ |
|---|---|---|---|---|---|---|---|---|---|---|---|---|
| $a_1$ | $t_{A1}(a_1)$ | $t_{A2}(a_1)$ | ... | $t_{An}(a_1)$ | $t_{B1}(a_1)$ | $t_{B2}(a_1)$ | ... | $t_{Bn}(a_1)$ | $t_{C1}(a_1)$ | $t_{C2}(a_1)$ | ... | $t_{Cn}(a_1)$ |
| $a_2$ | $t_{A1}(a_2)$ | $t_{A2}(a_2)$ | ... | $t_{An}(a_2)$ | $t_{B1}(a_2)$ | $t_{B2}(a_2)$ | ... | $t_{Bn}(a_2)$ | $t_{C1}(a_2)$ | $t_{C2}(a_2)$ | ... | $t_{Cn}(a_2)$ |
| $a_3$ | $t_{A1}(a_3)$ | $t_{A2}(a_3)$ | ... | $t_{An}(a_3)$ | $t_{B1}(a_3)$ | $t_{B2}(a_3)$ | ... | $t_{Bn}(a_3)$ | $t_{C1}(a_3)$ | $t_{C2}(a_3)$ | ... | $t_{Cn}(a_3)$ |
| ... | ... | ... | ... | ... | ... | ... | ... | ... | ... | ... | ... | ... |
| $a_X$ | $t_{A1}(a_X)$ | $t_{A2}(a_X)$ | ... | $t_{An}(a_X)$ | $t_{B1}(a_X)$ | $t_{B2}(a_X)$ | ... | $t_{Bn}(a_X)$ | $t_{C1}(a_X)$ | $t_{C2}(a_X)$ | ... | $t_{Cn}(a_X)$ |

PROJECTOR AND RELATED METHOD FOR PROJECTING A LIGHT BEAM

CROSS REFERENCE TO RELATED APPLICATION

This application claims the benefit of China Patent Applications No. 201610871558.6 and 201610866183.4, both filed on Sep. 30, 2016, the contents of which are incorporated herein in their entirety.

BACKGROUND OF THE INVENTION

1. Field of the Invention

The invention relates to a projector and a method for projecting a light beam with the projector. More particularly, the invention relates to a projector and a method for adjusting a light beam of the projector.

2. Description of the Prior Art

A conventional projector has a phosphor wheel, which comprises a plurality of phosphor coating areas. Each of the phosphor coating areas is used to radiate phosphorescence of a specific color when the phosphor wheel is illuminated by a light beam from a light source of the projector. For example, a phosphor wheel has three phosphor coating areas for radiating red, green and blue phosphorescence respectively. When the projector is turned on, the phosphor rotates so that the phosphor coating areas would be sequentially and periodically illuminated by the light beam of the light source so as to radiate phosphorescence of different colors. However, since the intensity of the light beam of the light source may not be constant, and the phosphor may not be uniformly coated on the surface of the phosphor wheel, the white balance of the projector may be incorrect.

Figure 1:
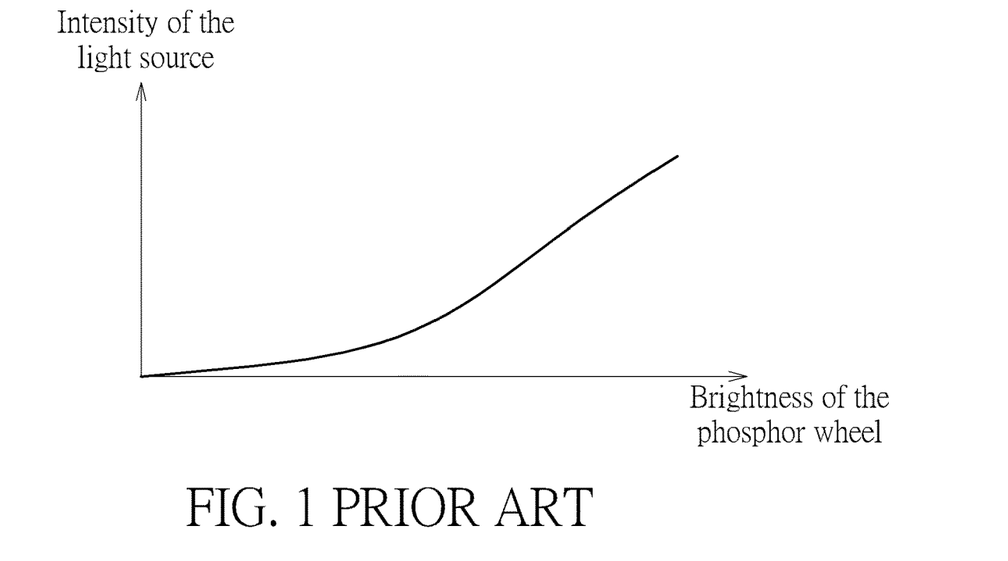
FIG. 1 is a diagram showing that the relationship between an intensity of a light beam of a light source and brightness of a phosphor wheel of a conventional projector is not linear.

Please refer to FIG. 1. FIG. 1 shows that the relationship between the intensity of the light beam of the light source and the brightness of the phosphor wheel is not linear. Accordingly, the brightness of the phosphor wheel cannot be linearly controlled by adjusting the intensity of the light source, and the difficulty of controlling the brightness of the phosphor wheel is increased.

Figure 2:
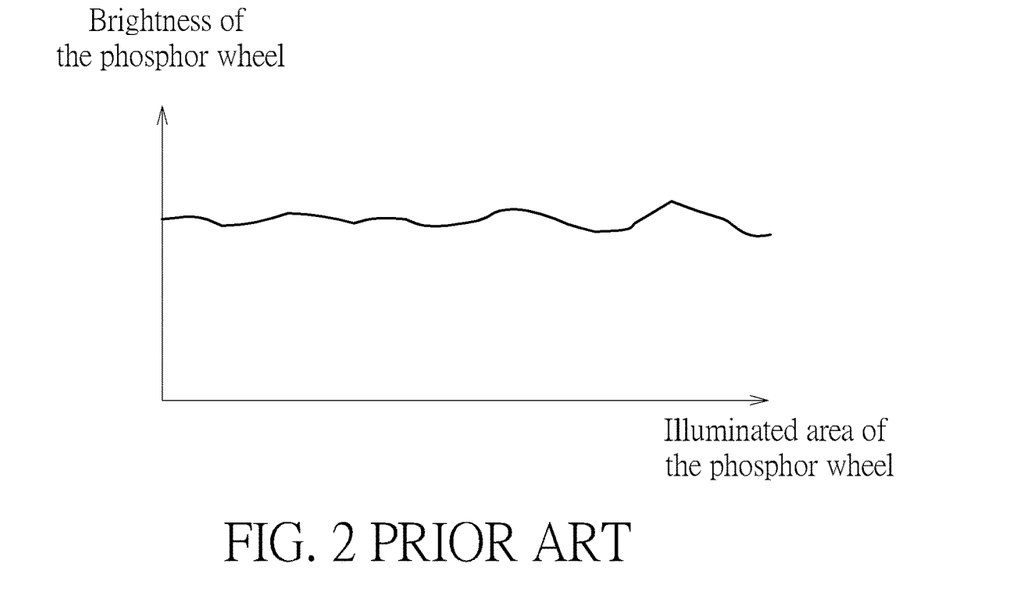
FIG. 2 is a diagram showing the relationship between the brightness of the phosphor wheel and the illuminated area of the phosphor wheel while all areas of the phosphor wheel are illuminated by the light beam with the same intensity.

Please refer to FIG. 2. FIG. 2 is a diagram showing the relationship between the brightness of the phosphor wheel and the illuminated area of the phosphor wheel while all areas of the phosphor wheel are illuminated by the light beam with the same intensity. Since the phosphor on the phosphor wheel is not uniformly coated on the surface of the phosphor wheel, the brightness of the phosphor wheel is not constant. Therefore, the quality of the image of the projector is deteriorated. For example, the white balance of the projected images cannot be optimized.

Figure 3:
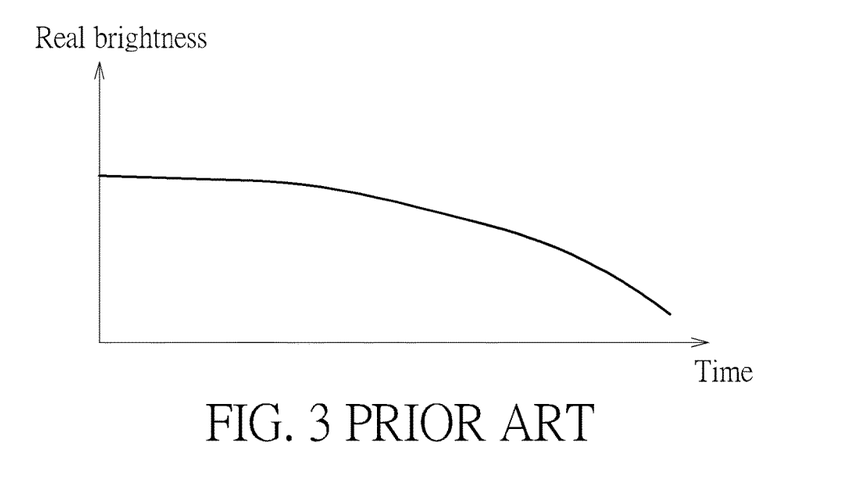
FIG. 3 is a diagram showing that real brightness of the projector would decay along with time.

Please refer to FIG. 3. FIG. 3 is a diagram showing that the real brightness of the projector would decay along with time. After the projector is turned on, since temperature of the phosphor wheel and the light source increase, both the efficiency of the phosphor wheel for generating phosphorescence and the efficiency of the light source for generating the light beam would decrease. This would result in poor white balance of the projector.

SUMMARY OF THE INVENTION

An embodiment of the present invention provides a method for projecting a light beam with a projector. The projector comprises a light source, a phosphor wheel and a digital mirror device (DMD). The phosphor wheel has a plurality of color sections. The method comprises the light source projecting a light source beam with a first intensity onto a first color section of the plurality of color sections when the DMD is operated at a first duty cycle; generating first real brightness of the light beam; determining whether a first difference between the first real brightness and first target brightness of the light beam is less than a first threshold; if the first difference is less than the first threshold, continuing to operate the DMD at the first duty cycle and to use the light source to project the light source beam onto the phosphor wheel at the first intensity when the light source is projecting the light source beam onto the first color section; and if the first difference is greater than the first threshold, using the light source to project the light source beam onto the first color section at a second intensity, and operating the DMD at a second duty cycle when the light source is projecting the light source beam onto the first color section. The second duty cycle is different from the first duty cycle and/or the second intensity is different from the first intensity.

Another embodiment of the present invention provides a method for projecting a light beam with a projector. The projector comprises a light source, a phosphor wheel and a digital mirror device (DMD). The phosphor wheel has a plurality of color sections, and each of the color sections has a plurality of color subsections. The method comprises the light source projecting a light source beam onto M color subsections of a first color section of the plurality of color sections when the DMD is operated at a first duty cycle, wherein M is a positive integer; generating first real brightness of the light beam according to an equation $y_1 = \sum_{i=1}^{M} t_i(a_i) \times p_i$, wherein $y_1$ is the first real brightness, i is an integer ranged from 1 to M, $a_i$ is an intensity of the light source beam projected onto an $i^{th}$ color subsection of the M first color subsections, $t_i(a_i)$ is a transform rate of the $i^{th}$ color subsection when the light source beam with the intensity $a_i$ is projected onto the $i^{th}$ color subsection, and $p_i$ is a time duration the light source projects the light source beam onto the $i^{th}$ color subsection; determining whether a first difference between the first real brightness and first target brightness of the light beam is less than a first threshold; and if the first difference is less than the first threshold, continuing to operate the DMD at the first duty cycle when the light source is projecting the light source beam onto the first color section, and continuing to use the light source to project the light source beam onto the $i^{th}$ color subsection at the intensity $a_i$. Wherein the second duty cycle is different from the first duty cycle and/or the intensity $b_i$ is different from the intensity $a_i$.

Another embodiment of the present invention provides a projector. The projector comprises a light source, a phosphor wheel, a control unit, a light sensor and a storage unit. The phosphor wheel comprises a first color section having a plurality of first color subsections. The control unit is coupled to the light source to control the light source to project a light source beam onto the first color subsections with a first intensity. The light sensor is coupled to the control unit and is configured to sense first stimulated brightness of some of the first color subsections when the light source is projecting the light source beam onto the first color subsections with the first intensity. The storage unit is coupled to the control unit and is configured to store a lookup table. The control unit generates a plurality of first transform rates associated with the first intensity according to the first stimulated brightness of some of the first color subsections, and the control unit controls the storage unit to record the first transform rates in the lookup table.

According to the embodiments of the present invention, methods for projecting a light beam with a projector are provided herein. The projector has a light source, a phosphor wheel, a digital mirror device (DMD) and a control unit. The phosphor wheel has a plurality of color sections. The light source projects a light source beam with a specific intensity onto a specific color section of the phosphor wheel when the DMD is operated at a specific duty cycle. By adjusting at least one of the specific duty cycle and the specific intensity, the control unit can adjust real brightness to approach target brightness of the specific color section so as to white balance the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
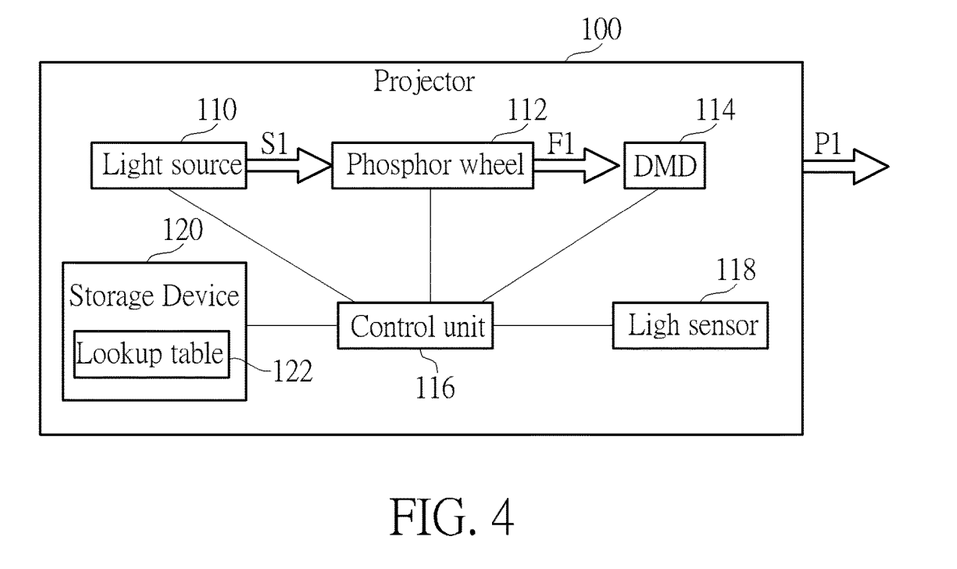
FIG. 4 is a functional block diagram of a projector according to an embodiment of the present invention.

Please refer to FIG. 4. FIG. 4 is a functional block diagram of a projector 100 according to an embodiment of the present invention. The projector 100 projects a light beam P1 and comprises a light source 110, a phosphor wheel 112, a digital mirror device (DMD) 114, a control unit 116, a light sensor 118 and a storage device 120. The light source 110, the phosphor wheel 112, the DMD 114, the light sensor 118 and the storage device 120 are coupled to and controlled by the control unit 116. When the control unit 116 drives the phosphor wheel 112 to rotate, the light source 110 projects a light source beam S1 onto the phosphor wheel 112, such that the phosphor wheel 112 generates a stimulated light beam F1, which is directed and projected onto the DMD 114. The light sensor 118 senses the stimulated light beam F1 so as to determine stimulated brightness of the phosphor wheel 112. The storage device 120 stores a lookup table 122, which is used to record a plurality of transform rates of the phosphor wheel 112.

Figure 5:
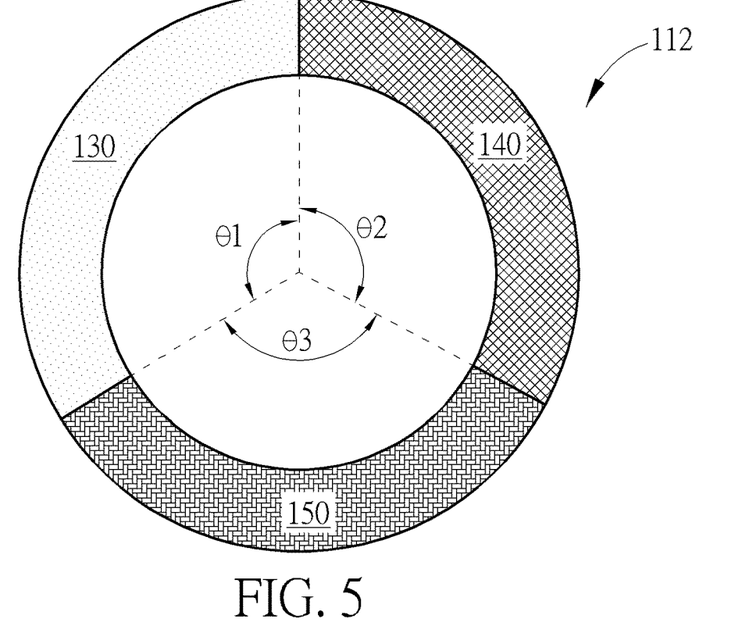
FIG. 5 is a schematic diagram of the phosphor wheel shown in FIG. 4.

The phosphor wheel 112 comprises a plurality of color sections. Please refer to FIG. 5. FIG. 5 is a schematic diagram of the phosphor wheel 112 shown in FIG. 4. In the embodiment, the phosphor wheel 112 comprises three color sections 130, 140 and 150. However, the number of the color sections of the phosphor wheel 112 is not limited thereto. The number of the color sections of the phosphor wheel 112 may be two, four, or an integer greater than four. The color sections 130, 140 and 150 may be a red color section, a green color section and a blue color section respectively for generating red phosphorescence, green phosphorescence and blue phosphorescence. The dimension of each of the three color sections 130, 140 and 150 may be the same. In other words, the angles θ1, θ2 and θ3 corresponding to the color sections 130, 140 and 150 may be equal to each other.

Figure 6:
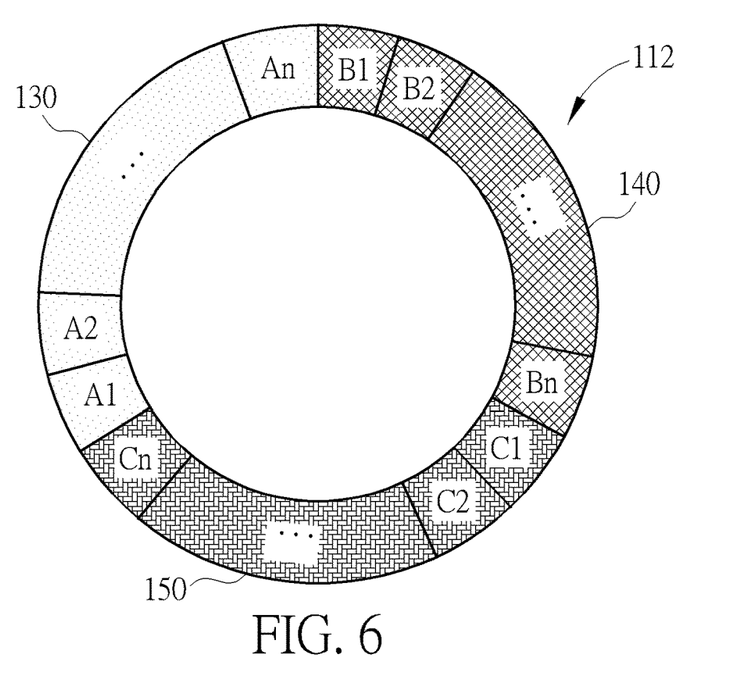
FIG. 6 is another schematic diagram of the phosphor wheel shown in FIG. 4.

Each of the color sections 130, 140 and 150 may further comprise a plurality of color subsections. Please refer to FIG. 6. FIG. 6 is another schematic diagram of the phosphor wheel 112 shown in FIG. 4. In the embodiment, the color section 130 has color subsections A1 to An, the color section 140 has color subsections B1 to Bn, and the color section 150 has color subsections C1 to Cn. The dimension of each of the color subsections A1 to An, B1 to Bn and C1 to Cn may be the same.

Figure 7:
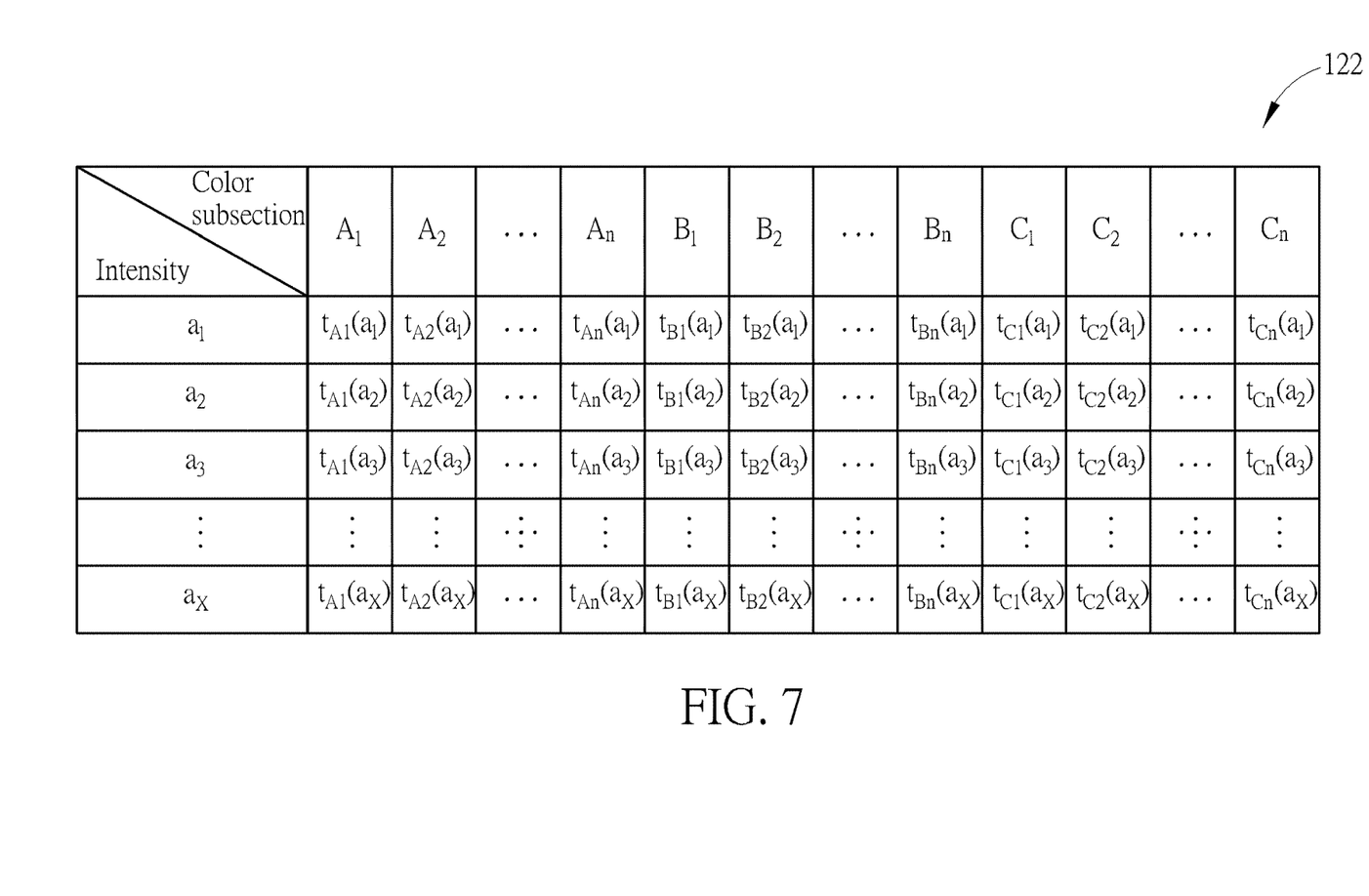
FIG. 7 is a diagram illustrating the data structure of the lookup table shown in FIG. 4.

Please refer FIG. 4 and FIG. 6. As mentioned previously, when the control unit 116 drives the phosphor wheel 112 to rotate, the light source 110 projects a light source beam S1 onto the phosphor wheel 112, such that the phosphor wheel 112 generates a stimulated light beam F1. However, since the phosphor on the phosphor wheel is not uniformly coated on the surface of the phosphor wheel 112, the brightness of the phosphor wheel 112 is not constant. In order to determine the real brightness of the projector 100, the light sensor 118 is used to sense the stimulated light beam F1 so as to determine the stimulated brightness of the phosphor wheel 112 when the light source 110 projects the light source beam S1 onto the color subsections A1 to An, B1 to Bn and C1 to Cn with various intensities within different periods. The control unit 116 generates transform rates according to the stimulated brightness of the color subsections A1 to An, B1 to Bn and C1 to Cn, and control unit 116 controls the storage unit 120 to record the transform rates in the lookup table 122. Please refer to FIG. 7. FIG. 7 is a diagram illustrating the data structure of the lookup table 122. On the first row, each entry represents a corresponding one of the color subsections A1 to An, B1 to Bn and C1 to Cn. On the first column, each entry represents a corresponding intensity of the light source beam S1. Each of other remaining entries represents a corresponding transform rate $t_E(F)$. The transform rate $t_E(F)$ contains two parameters E and F, the parameter E represents a corresponding color subsection, and the parameter F represents a corresponding intensity of the light source beam S1. In detail, the transform rate $t_E(F)$ is determined by sensing the stimulated brightness of a corresponding color subsection E when the light source 110 projects the light source beam S1 with a corresponding intensity F onto the color subsection E. For example, the transform rate $t_{A1}(a_l)$ is determined by sensing the stimulated brightness of the color subsection A1 when the light source 110 projects the light source beam S1 with a corresponding intensity $a_1$ onto the color subsection A1. The transform rate $t_{B2}(a_3)$ is determined by sensing the stimulated brightness of the color subsection B2 when the light source 110 projects the light source beam S1 with a corresponding intensity $a_3$ onto the color subsection B2. The transform rate $t_{cn}(a_x)$ is determined by sensing the stimulated brightness of the color subsection Cn when the light source 110 projects the light source beam S1 with a corresponding intensity $a_x$ onto the color subsection Cn, and so forth. Since the transform rates in the lookup table 122 are determined based on the measured stimulated brightness of the color subsections A1 to An, B1 to Bn and C1 to Cn, the transform rates in the lookup table 122 could be used to determine the real brightness of the light beam P1.

Figure 8:
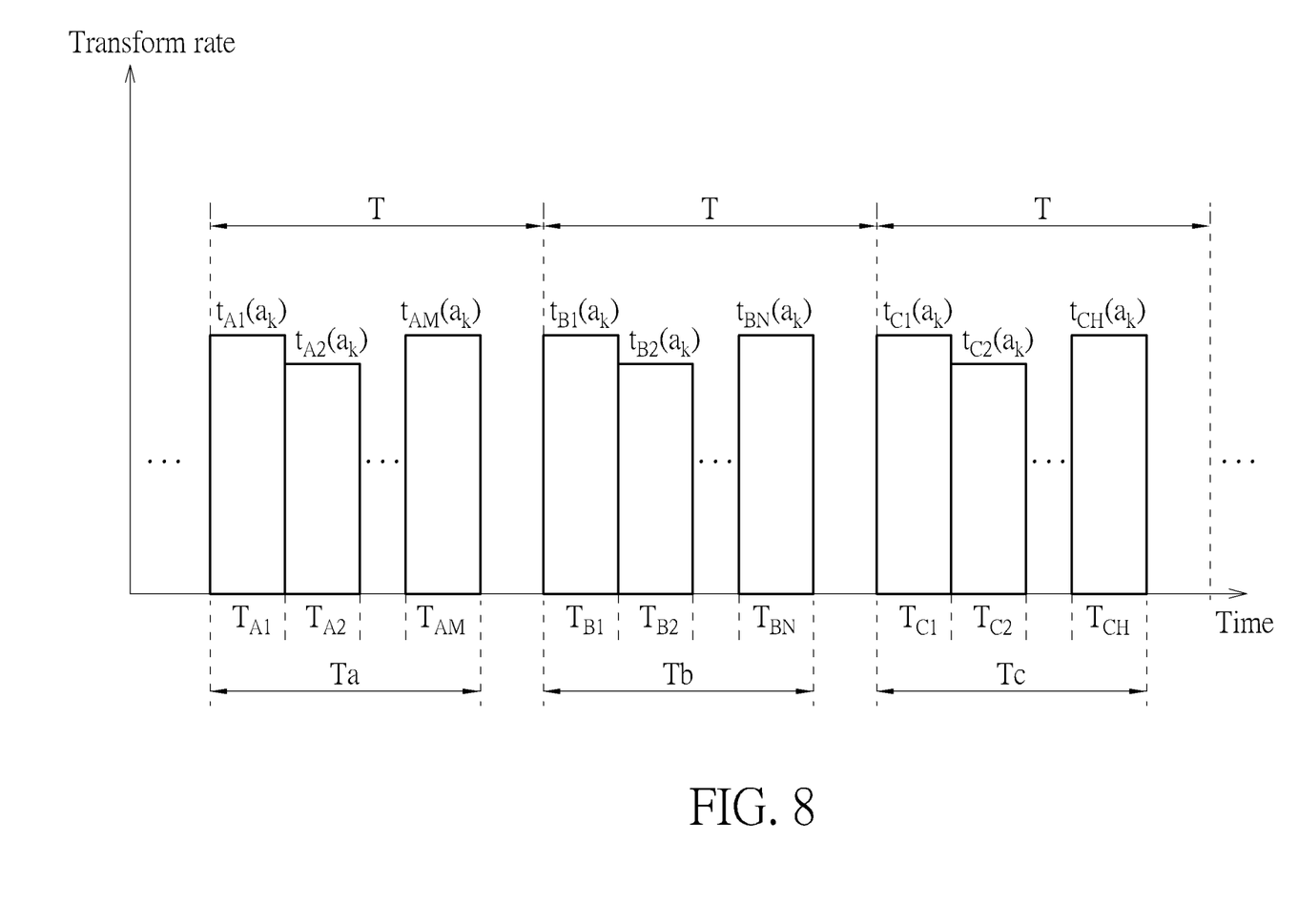
FIG. 8 is a timing diagram illustrating the transform rates of related color subsections when the light source shown in FIG. 4 projects the light source beam with a corresponding intensity $a_K$ onto the color subsections.

Please refer to FIG. 8. FIG. 8 is a timing diagram illustrating the transform rates of related color subsections when the light source 110 projects the light source beam S1 with a corresponding intensity $a_K$ onto the color subsections, where K is an integer and $1 \leq K \leq x$. When the phosphor wheel 112 is driven by the control unit 116 to rotate at a constant speed, the color subsections A1 to An, B1 to Bn and C1 to Cn would be sequentially illuminated by the stimulated light beam F1 periodically with a period T. In addition, during the three periods (i.e. three times of T) illustrated in FIG. 8, the control unit 116 turns on the DMD 114 within time durations Ta, Tb and Tc and turns off the DMD 114 within the remaining time durations. In other words, the light source 110 projects the light source beam S1 with the intensity $a_K$ onto the color section 130 when the DMD 114 is operated at a duty cycle Ta/T; the light source 110 projects the light source beam S1 with the intensity $a_K$ onto the color section 140 when the DMD 114 is operated at a duty cycle Tb/T; and the light source 110 projects the light source beam S1 with the intensity $a_K$ onto the color section 150 when the DMD 114 is operated at a duty cycle Tc/T. Within the time duration Ta, the color subsections A1 to AM are illuminated by the light source beam S1, where $1 \leq M \leq n$. Therefore, the transform rate $t_{A1}(a_K)$ to $t_{AM}(a_K)$ of the color subsections A1 to AM could be used to determine the real brightness of the light beam P1 when the light source 110 projects the light source beam S1 with the intensity $a_K$ onto the color section 130. Similarly, the transform rate $t_{B1}(a_K)$ to $t_{BN}(a_K)$ of the color subsections B1 to BN could be used to determine the real brightness of the light beam S1 when the light source 110 projects the light source beam S1 with the intensity $a_K$ onto the color section 140, and the transform rate $t_{C1}(a_K)$ to $t_{CH}(a_K)$ of the color subsections C1 to CH could be used to determine the real brightness of the light beam P1 when the light source 110 projects the light source beam S1 with the intensity $a_K$ onto the color section 150, where $1 \leq N \leq n$ and $1 \leq H \leq n$.

In detail, the real brightness of the light beam P1 within the first period T shown in FIG. 8 could be generated according to an equation $y_1 = \Sigma_{i=1}^{M} t_i(a_i) \times p_i$, wherein $y_1$ is the real brightness of the light beam P1 within the first period T, i is an integer ranged from 1 to M, $1 \leq M \leq n$, $a_i$ is an intensity of the light source beam S1 projected onto an $i^{th}$ color subsection of the color subsections A1 to An, $t_1(a_1)$ is a transform rate of the $i^{th}$ color subsection of the color subsections A1 to An when the light source beam S1 with the intensity $a_i$ is projected onto the $i^{th}$ color subsection, and $p_i$ is a time duration the light source 110 projects the light source beam S1 onto the $i^{th}$ color subsection. That is, the real brightness of the light beam P1 within the first period T is equal to $t_{A1}(a_K) \times T_{A1} + t_{A2}(a_K) \times T_{A2} + \ldots + t_{AM}(a_K) \times T_{AM}$, wherein $T_{A1}$, $T_{A2}$ and $T_{AM}$ are time durations the light source 110 projects the light source beam S1 onto the color subsections A1, A2 and AM.

Similarly, the real brightness of the light beam P1 within the second period T shown in FIG. 8 could be generated according to an equation $y_2 = \Sigma_{k=1}^{N} t_k(a_k) \times p_k$, wherein $y_2$ is the real brightness of the light beam P1 within the second period T, k is an integer ranged from 1 to N, $1 \leq N \leq n$, $a_k$ is an intensity of the light source beam S1 projected onto a $k^{th}$ color subsection of the color subsections B1 to Bn, $t_k(a_k)$ is a transform rate of the $k^{th}$ color subsection of the color subsections B1 to Bn when the light source beam S1 with the intensity $a_k$ is projected onto the $k^{th}$ color subsection, and $p_k$ is a time duration the light source 110 projects the light source beam S1 onto the $k^{th}$ color subsection of the color subsections B1 to Bn. That is, the real brightness of the light beam P1 within the second period T is equal to $t_{B1}(a_K) \times T_{B1} + t_{B2}(a_K) \times T_{B2} + \ldots + t_{BN}(a_K) \times T_{BN}$, wherein $T_{B1}$, $T_{B2}$ and $T_{BN}$ are time durations the light source 110 projects the light source beam S1 onto the color subsections B1, B2 and BN.

Also, the real brightness of the light beam P1 within the third period T shown in FIG. 8 could be generated according to an equation $y_3 = \Sigma_{j=1}^{H} t_j(a_j) \times p_j$, wherein $y_3$ is the real brightness of the light beam P1 within the third period T, j is an integer ranged from 1 to H, $1 \leq H \leq n$, $a_j$ is an intensity of the light source beam S1 projected onto a $j^{th}$ color subsection of the color subsections C1 to Cn, $t_j(a_j)$ is a transform rate of the $j^{th}$ color subsection of the color subsections C1 to Cn when the light source beam S1 with the intensity $a_j$ is projected onto the $j^{th}$ color subsection, and $p_j$ is a time duration the light source 110 projects the light source beam S1 onto the $k^{th}$ color subsection of the color subsections C1 to Cn. That is, the real brightness of the light beam P1 within the third period T is equal to $t_{C1}(a_K) \times T_{C1} + t_{C2}(a_K) \times T_{C2} + \ldots + t_{CH}(a_K) \times T_{CH}$, wherein $T_{C1}$, $T_{C2}$ and $T_{CH}$ are time durations the light source 110 projects the light source beam S1 onto the color subsections C1, C2 and CH.

After the real brightness $y_1$ of the light beam P1 is determined, the control unit 116 determines whether a first difference between the real brightness $y_1$ and first target brightness of the light beam P1 is less than a first threshold. The first target brightness is desired brightness of the color section 130. If the first difference is less than the first threshold, it means that the real brightness $y_1$ is close to the desired brightness of the color section 130, such that the control unit 116 controls the DMD 114 to continue operating at the duty cycle Ta/T and controls the light source 110 to project the light source beam S1 onto the phosphor wheel 112 at the original intensity $a_k$ when the light source 110 is projecting the light source beam S1 onto the color section 130. If the first difference is greater than the first threshold, it means that the real brightness $y_1$ is far away from the desired brightness of the color section 130, such that the control unit 116 controls the light source 110 to project the light source beam S1 onto the color section 130 at an intensity $a_w$, and the control unit 116 controls the DMD 114 to operate at a second duty cycle when the light source 110 is projecting the light source beam S1 onto the color section 130. The second duty cycle is different from the duty cycle Ta/T, or the intensity $a_w$ is different from the original intensity $a_k$, or the second duty cycle is different from the duty cycle Ta/T and the intensity $a_w$ is different from the original intensity $a_k$. In an embodiment, if the first difference is greater than the first threshold, the second duty cycle is different from the duty cycle Ta/T and the intensity $a_w$ is the same as the original intensity $a_k$. In another embodiment, if the first difference is greater than the first threshold, the second duty cycle is the same as the duty cycle Ta/T and the intensity $a_w$ is different from the original intensity $a_k$. In another embodiment, if the first difference is greater than the first threshold, the second duty cycle is different from the duty cycle Ta/T and the intensity $a_w$ is different from the original intensity $a_k$. In another embodiment, if the first difference is greater than the first threshold, and if the duty cycle Ta/T has not reached 100%, the second duty cycle is different from the duty cycle Ta/T, and the second intensity is same as the original intensity $a_k$. Otherwise, if the duty cycle Ta/T has reached 100%, the second duty cycle is same as the duty cycle Ta/T, and the second intensity is different from the original intensity $a_k$. By adjusting at least one of the duty cycle and the intensity, the control unit 116 can adjust the real brightness $y_1$ to approach the first target brightness of the color section 130.

Figure 9:
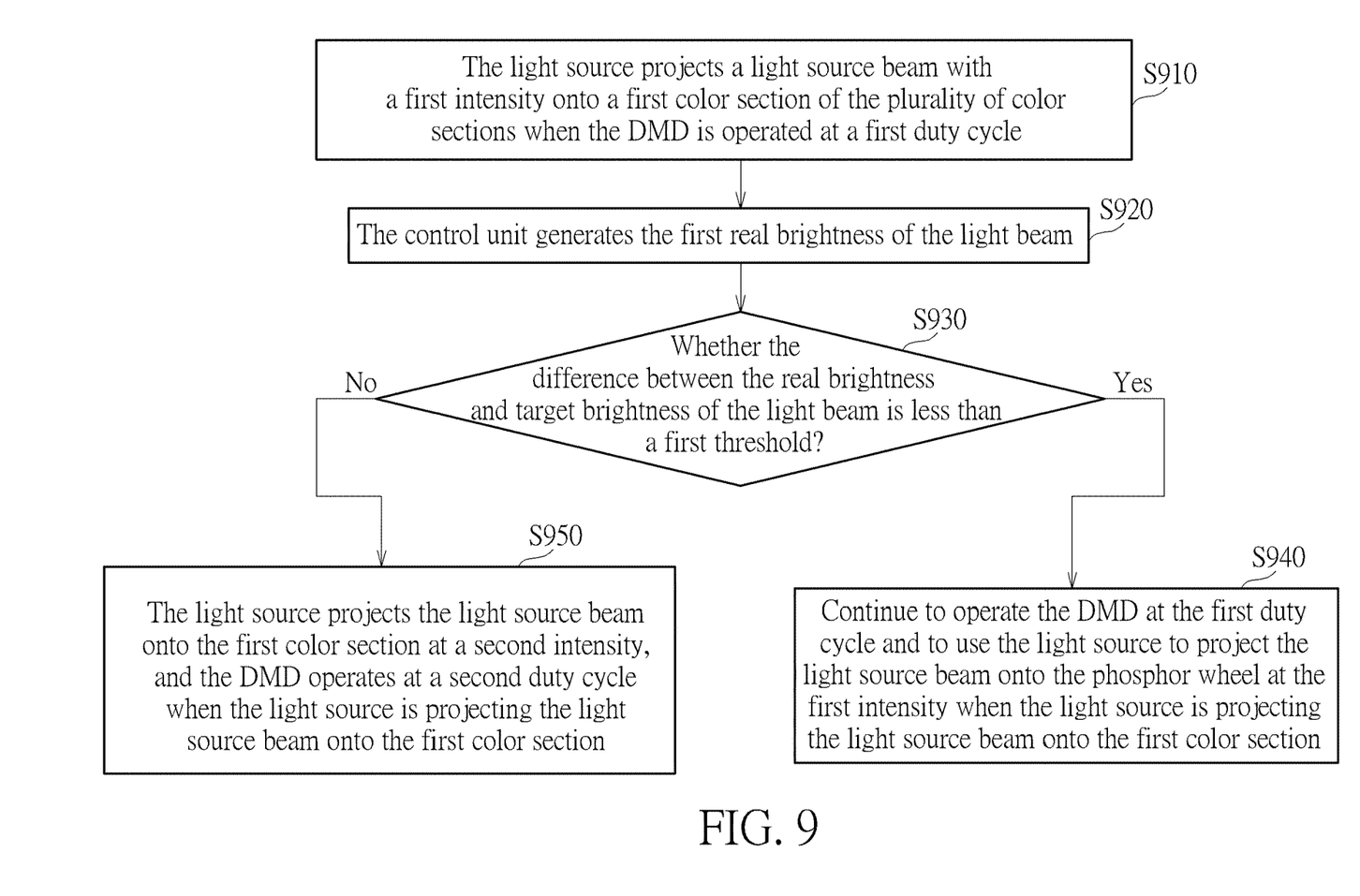
FIG. 9 is a flow chart of a method for projecting the light beam P1 of the projector according to an embodiment of the present invention.

Please refer to FIG. 9. FIG. 9 is a flow chart of a method for projecting the light beam P1 of the projector 100 according to an embodiment of the present invention. The method comprises:

Step S910: The light source 110 projects the light source beam S1 with a first intensity onto the first color section 130 when the DMD 114 is operated at a first duty cycle Ta/T;

Step S920: The control unit 116 generates the first real brightness $y_1$ of the light beam P1;

Step S930: The control unit 116 determines whether the difference between the first real brightness $y_1$ and the target brightness of the light beam is less than the first threshold; if so, execute step S940; otherwise, execute step S950;

Step S940: Continue to operate the DMD 114 at the first duty cycle Ta/T and to use the light source 110 to project the light source beam S1 onto the phosphor wheel 112 at the first intensity when the light source 110 is projecting the light source beam S1 onto the first color section 130; and Step S950: The light source 110 projects the light source beam S1 onto the first color section 130 at a second intensity, and the DMD 114 operates at a second duty cycle when the light source 110 is projecting the light source beam S1 onto the first color section 130, wherein the second duty cycle is different from the first duty cycle Ta/T and/or the second intensity is different from the first intensity.

Figure 10:
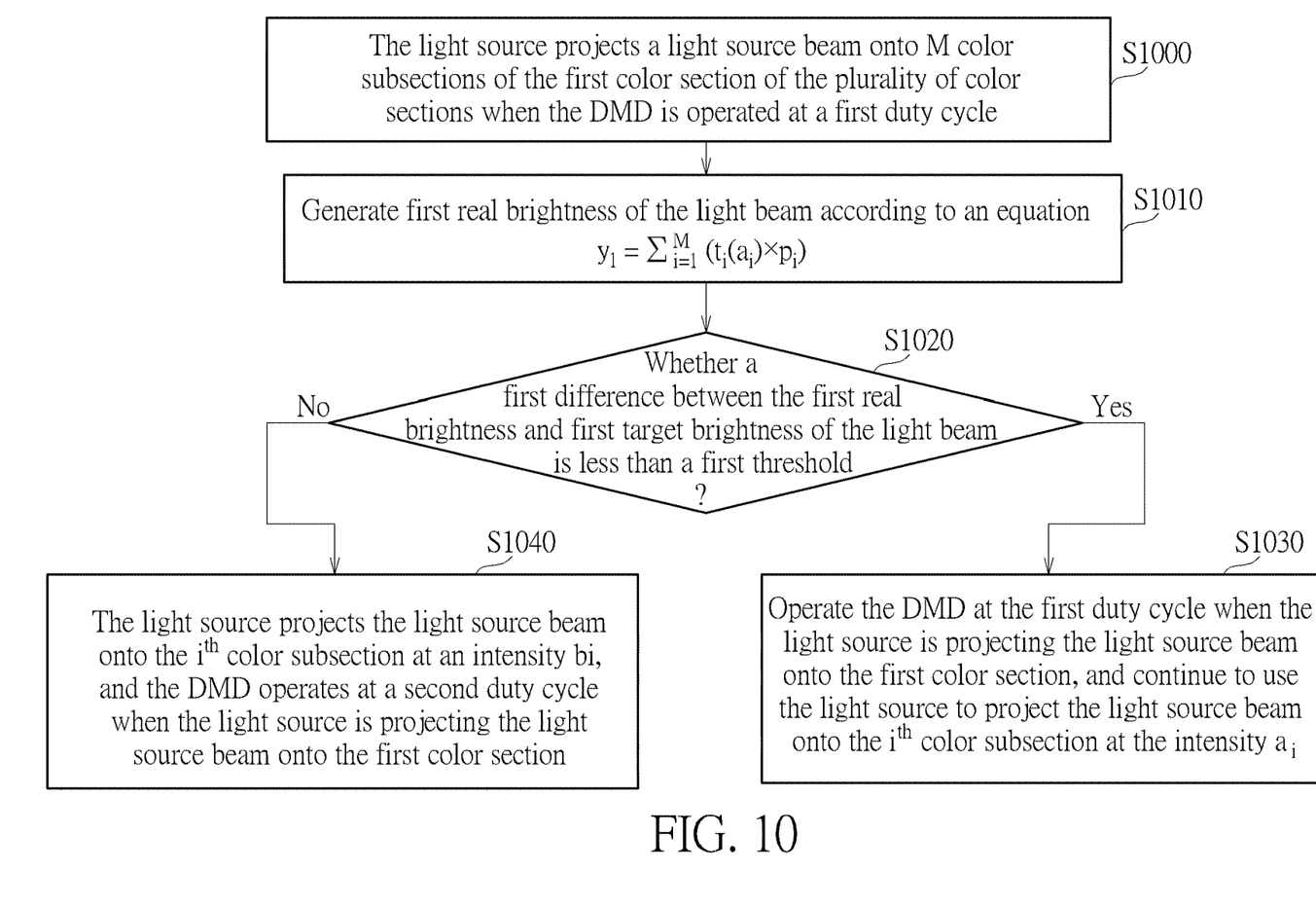
FIG. 10 is a flow chart of a method for projecting the light beam P1 of the projector according to an embodiment of the present invention.

Please refer to FIG. 10. FIG. 10 is a flow chart of a method for projecting the light beam P1 of the projector 100 according to another embodiment of the present invention. The method comprises:

Step S1000: The light source 110 projects the light source beam S1 onto M color subsections of a first color section 130 when the DMD 114 is operated at a first duty cycle Ta/T, wherein M is a positive integer;

Step S1010: The control unit 116 generates first real brightness $y_1$ of the light beam S1 according to an equation $y_1 = \sum_{i=1}^{M} t_i(a_i) \times p_i$, wherein i is an integer ranged from 1 to M, $a_i$ is an intensity of the light source beam S1 projected onto an $i^{th}$ color subsection of the M first color subsections, $t_i(a_i)$ is a transform rate of the $i^{th}$ color subsection when the light source beam S1 with the intensity $a_i$ is projected onto the $i^{th}$ color subsection, and $p_i$ is a time duration the light source 110 projects the light source beam S1 onto the $i^{th}$ color subsection;

Step S1020: The control unit 116 determines whether a first difference between the first real brightness $y_1$ and the first target brightness of the light beam S1 is less than a first threshold; if so, execute step S1030; otherwise, execute step S1040;

Step 1030: Continue to operate the DMD 114 at the first duty cycle Ta/T when the light source 110 is projecting the light source beam S1 onto the first color section 130, and continue to use the light source to project the light source beam onto the $i^{th}$ color subsection at the intensity $a_i$; and Step S1040: The light source 110 projects the light source beam S1 onto the $i^{th}$ color subsection at an intensity $b_i$, and the DMD 114 operates at a second duty cycle when the light source 110 is projecting the light source beam S1 onto the first color section 130, wherein the second duty cycle is different from the first duty cycle Ta/T and/or the intensity $b_i$ is different from the intensity $a_i$.

In a similar way, the control unit 116 can adjust the real brightness $y_2$ to approach second target brightness of the color section 140 by adjusting at least one of the duty cycle of DMD 114 and the intensity of the light source beam S1 corresponding to the color section 140, and the control unit 116 can adjust the real brightness $y_3$ to approach third target brightness of the color section 150 by adjusting at least one of the duty cycle of DMD 114 and the intensity of the light source beam S1 corresponding to the color section 150. The descriptions thereof would not be repeated herein.

Since the color sections 130, 140 and 150 are used to generate three different colors of the stimulated light beam F1, the projector 100 would have an optimized white balance by adjusting the real brightness $y_1$, $y_2$ and $y_3$. In an embodiment of the present invention, when the control unit 116 adjusts the white balance of the projector 100, if the projector 110 has not optimized white balance and the first target brightness has reached first maximum brightness of the light beam S1 corresponding to the color section 130 (i.e. the real brightness $y_1$ cannot be increased anymore), the control unit 116 adjusts the real brightness $y_2$ and/or the real brightness $y_3$ for white balancing the projector 100. And as described previously, the real brightness $y_2$ could be adjusted by adjusting at least one of the duty cycle of DMD 114 and the intensity of the light source beam S1 corresponding to the color section 140, and the real brightness $y_3$ could be adjusted by adjusting at least one of the duty cycle of DMD 114 and the intensity of the light source beam S1 corresponding to the color section 150. Similarly, if the real brightness $y_2$ cannot be increased anymore and the projector 110 has not optimized white balance, the control unit 116 could adjust the real brightness $y_1$ and/or the real brightness $y_3$ for white balancing the projector 100. If the real brightness $y_3$ cannot be increased anymore and the projector 110 has not optimized white balance, the control unit 116 could adjust the real brightness $y_1$ and/or the real brightness $y_2$ for white balancing the projector 100.

In an embodiment of the present invention, the lookup table 122 is established to record a plurality of transform rates of a specific color subsection of the color subsections A1 to An, B1 to Bn and C1 to Cn. First, the light source 110 projects the light source beam S1 onto the specific color subsection in a plurality of periods T, wherein various intensities of the light source beam S1 are used in different periods. Then, by sensing stimulated brightness of the specific subsection when the light source beam S1 is projected onto the specific color subsection with various intensities in different periods, the light sensor 118 generates a plurality of transform rates of the specific color subsection associated with the various intensities.

Moreover, since temperature of the phosphor wheel 112 and the light source 110 increase after the projector 100 is powered on, the light source beam S1, the stimulated light beam F1 and the light beam would decay gradually. Accordingly, the transform rates recorded in the lookup table 122 should be updated timely to match the real-time optical characteristic of the light source 110 and the phosphor wheel 112. In order to update the lookup table 122, new transform rates of the color subsections A1 to An, B1 to Bn and C1 to Cn should be generated.

In an embodiment of the present invention, before updating the transform rates $t_{41}(a_s)$, $t_{42}(a_s)$, $t_{43}(a_s)$, ... and $t_{4n}(a_s)$ stored in the lookup table 122, the control unit 116 controls the light sensor 118 to generate new transform rates of P color subsections of the color section 130 by sensing stimulated brightness of the P color subsections when the light source 110 projects the light source beam S1 with an intensity $a_s$ onto the P color subsections, wherein S and P are positive integers, $1 \leq P < n$, and $1 \leq S \leq x$. Then, the control unit determines whether a first ratio of P and Q is greater than a predetermined ratio. Where Q is the number of all subsections A1 to An of the color section 130. In the embodiment, Q is equal to n. If the first ratio is greater than the predetermined ratio, the control unit 116 generates speculative transform rates of (Q-P) color subsections of the color section 130 according to the new transform rates of the P color subsections, where the (Q-P) color subsections are color subsections of the color section 130 other than the P color subsections. Take the color subsections A1 to A8 illustrated in FIG. 11 for example, each of the color sections 130, 140 and 150 has eight color subsections, and new transform rates $t_{41}(a_s)$, $t_{43}(a_s)$ to $t_{46}(a_s)$ and $t_{48}(a_s)$ of the color subsections A1, A3 to A6 and A8 have been generated while the new transform rates $t_{42}(a_s)$ and $t_{47}(a_s)$ of the color subsections A2 and A7 have not been generated. In this case, P is equal to 6, Q is equal to 8, and (Q-P) is equal to 2. The control unit 116 would generate speculative transform rates of the color subsection A2 and A7 according to the new transform rates of the color subsection A1, A3 to A6 and A8. When the speculative transform rates of the color subsections A2 and A7 are generated, the control circuit 116 updates the transform rates $t_{41}(a_s)$ to $t_{48}(a_s)$ stored in the lookup table 122 according to the new transform rates $t_{41}(a_s)$, $t_{43}(a_s)$ to $t_{46}(a_s)$ and $t_{48}(a_s)$ of the color subsections A1, A3 to A6 and A8 and the speculative transform rates $t_{42}(a_s)$ and $t_{47}(a_s)$ of the color subsections A2 and A7.

In an embodiment of the present invention, the step of determining whether the first ratio of P and Q is greater than the predetermined ratio is only executed when it has been determined that a difference between each new transform rate of P color subsections and a corresponding current transform rate recorded in the lookup table 122 is greater than a predetermined value.

Figure 11:
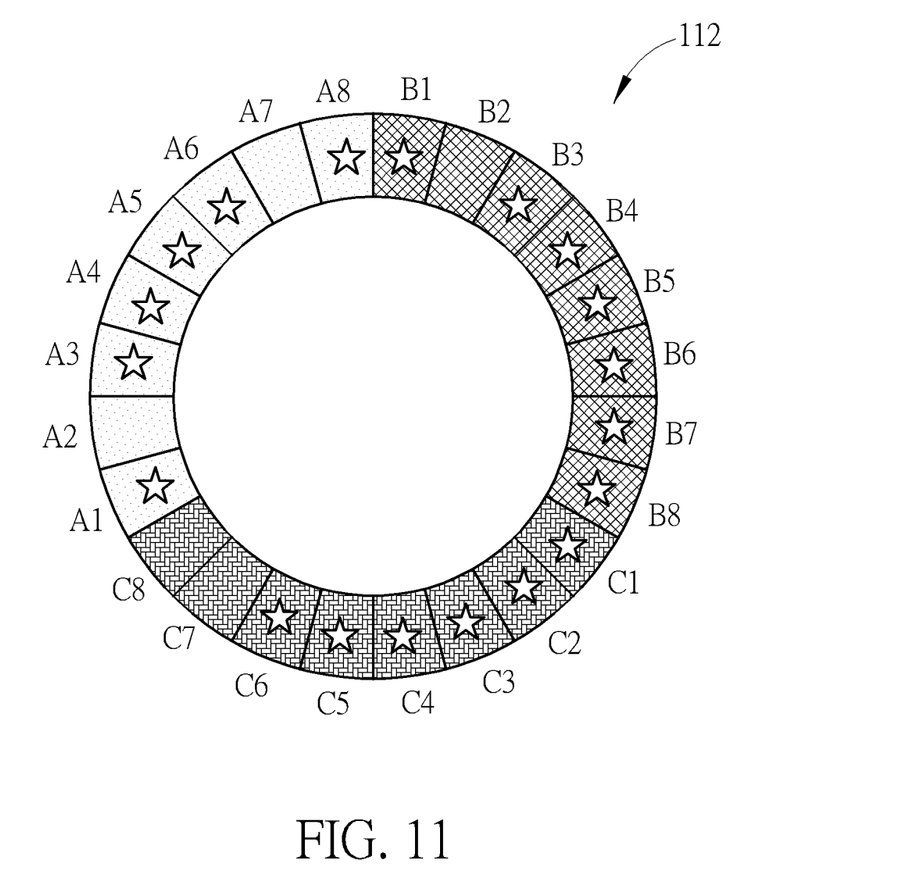
FIG. 11 is another schematic diagram of the phosphor wheel shown in FIG. 4.

In an embodiment of the present invention, a speculative transform rate of each color subsection of the (Q-P) color subsections is generated according to the transform rates of at least two color subsections of the P color subsections. For example, the speculative transform rate of the color subsection A2 may be generated according to the new transform rates of the color subsections A1, A3 and A4. In an embodiment of the present invention, color subsections A1, A3 and A4 may each have a weighting, and the weighting is negatively correlated with angles between the color subsection A2 and the color subsections A1, A3 and A4. Since the angle between the color subsection A2 and the color subsection A1 is equal to the angle between the color subsection A2 and the color subsection A3, and the angle between the color subsection A2 and the color subsection A1 is less than the angle between the color subsection A2 and the color subsection A4, the weighting of the color subsection A1 is equal to the weighting of the color subsection A3, and weighting of the color subsection A1 is greater than the weighting of the color subsection A4. For example, the weighting of the color subsection A1 and the weighting of the color subsection A3 may be equal to 0.4, and the weighting of the color subsection A4 may be equal to 0.2. When the weightings of the color subsections A1, A3 and A4 are obtained, the speculative transform rate of the color subsection A2 could be determined according to an equation $t_{42}(a_i) = 0.4 \times (t_{41}(a_i) + t_{43}(a_i)) + 0.2 + t_{44}(a_i)$. $t_{42}(a_i)$ is the speculative transform rate of the color subsection A2, $a_i$ is an intensity of the light source beam S1 projected onto the color subsections A1, A3 and A4, and $t_{41}(a_i)$, $t_{43}(a_i)$ and $t_{44}(a_i)$ are the new transform rates of the subsections A1, A3 and A4. The foresaid method for determining the speculative transform rate $t_{42}(a_i)$ is only an example, and the present invention is not limited thereto. Actually, there are many equations could be used to determine the speculative transform rate $t_{42}(a_1)$ so as to satisfy different applications of using the projector 100. For example, in an embodiment of the present invention, the speculative transform rate $t_{42}(a_i)$ may be determined only according to one of the new transform rates $t_{41}(a_i)$ and $t_{43}(a_i)$. In another embodiment, the speculative transform rate $t_{42}(a_i)$ may be determined only according to the new transform rates $t_{41}(a_i)$ and $t_{43}(a_i)$ (i.e. without the new transform rates $t_{44}(a_i)$). In another embodiment, the speculative transform rate $t_{42}(a_i)$ may be determined according to $t_{41}(a_i)$, $t_{43}(a_i)$, $t_{44}(a_i)$ and $t_{45}(a_i)$. In this case, the weighting of the color subsection A5 is less than the weightings of the color subsections A1, A3 and A4, the weighting of the color subsection A4 is less than the weightings of the color subsections A1 and A3, and the weighting of the color subsection A3 is equal to the weighting of the color subsection A1, since the color subsection A5 is more far away from the color subsection A2 than the color subsections A1, A3 and A4, and the color subsection A4 is more far away from the color subsection A2 than the color subsections A1 and A3.

Figure 12:
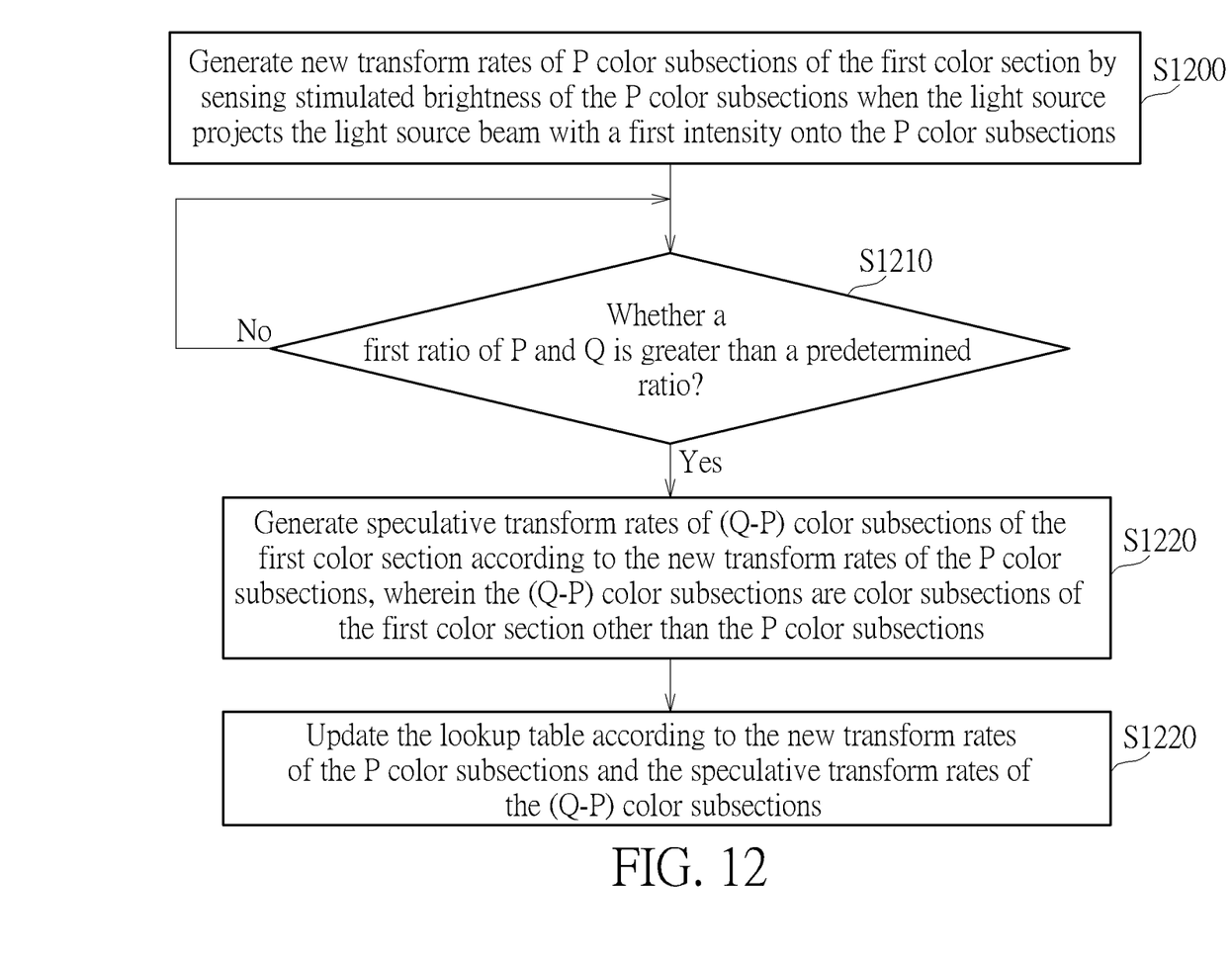
FIG. 12 is a flow chart of a method for updating the lookup table according to an embodiment of the present invention.

Please refer to FIG. 12. FIG. 12 is a flow chart of a method for updating the lookup table 122 according to an embodiment of the present invention. The method comprises:

Step S1200: Generate new transform rates of P color subsections of the first color section 130 by sensing stimulated brightness of the P color subsections when the light source 110 projects the light source beam S1 with a first intensity onto the P color subsections;

Step S1210: Determine whether a first ratio of P and Q is greater than a predetermined ratio; if so, execute step S1220; otherwise, wait until the result becomes positive (e.g. other new transform rate is generated);

Step S1220: Generate speculative transform rates of (Q-P) color subsections of the first color sections A1 to A8 according to the new transform rates of the P color subsections, wherein the (Q-P) color subsections are color subsections of the first color section other than the P color subsections; and Step S1230: Update the lookup table 122 according to the new transform rates of the P color subsections and the speculative transform rates of the (Q-P) color subsections.

The transform rates of the color subsections B1 to B8 and C1 to C8 could be updated in a similar way. Therefore, for the sake of simplicity, the descriptions thereof would not be repeated herein.

According to the embodiments of the present invention, methods for projecting a light beam with a projector are provided herein. The projector has a light source, a phosphor wheel, a digital mirror device (DMD) and a control unit. The phosphor wheel has a plurality of color sections. The light source projects a light source beam with a specific intensity onto a specific color section of the phosphor wheel when the DMD is operated at a specific duty cycle. By adjusting at least one of the specific duty cycle and the specific intensity, the control unit can adjust real brightness to approach target brightness of the specific color section so as to optimize white balance of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for projecting a light beam with a projector, the projector comprising a light source, a phosphor wheel and a digital mirror device (DMD), the phosphor wheel having a plurality of color sections, the method comprising:
   the light source projecting a light source beam with a first intensity onto a first color section of the plurality of color sections when the DMD is operated at a first duty cycle;
   generating first real brightness of the light beam;
   determining whether a first difference between the first real brightness and first target brightness of the light beam is less than a first threshold;
   if the first difference is less than the first threshold, continuing to operate the DMD at the first duty cycle and to use the light source to project the light source beam onto the phosphor wheel at the first intensity when the light source is projecting the light source beam onto the first color section; and
   if the first difference is greater than the first threshold, using the light source to project the light source beam onto the first color section at a second intensity, and operating the DMD at a second duty cycle when the light source is projecting the light source beam onto the first color section;
   wherein the second duty cycle is different from the first duty cycle or the second intensity is different from the first intensity.

2. The method of claim 1, wherein the second duty cycle is different from the first duty cycle and the second intensity is the same as the first intensity.

3. The method of claim 1, wherein the second duty cycle is the same as the first duty cycle and the second intensity is different from the first intensity.

4. The method of claim 1 further comprising:
   if the projector has not reached white balance and the first target brightness has reached first maximum brightness of the light beam corresponding to the first color section, using the light source to project the light source beam onto a second color section of the plurality of color sections at a fourth intensity, and operating the DMD at a fourth duty cycle when the light source is projecting the light source beam onto the second color section;
   wherein the fourth duty cycle is different from a third duty cycle used to operate the DMD when the light source is projecting the light source beam onto the second color section in a previous period or the fourth intensity is different from a third intensity of the light source beam projected by the light source onto the second color section in the previous period.

5. The method of claim 1, wherein:
   if the first duty cycle has not reached 100%, the second duty cycle is different from the first duty cycle, and the second intensity is same as the first intensity; or
   if the first duty cycle has reached 100%, the second duty cycle is same as the first duty cycle, and the second intensity is different from the first intensity.

6. The method of claim 1 further comprising:
   the light source projecting the light source beam with a third intensity onto a second color section of the plurality of color sections when the DMD is operated at a third duty cycle;
   generating second real brightness of the light beam;
   determining whether a second difference between the second real brightness and second target brightness of the light beam is less than a second threshold;
   if the second difference is less than the second threshold, continuing to operate the DMD at the third duty cycle and to use the light source to project the light source beam onto the second color section at the third intensity when the light source is projecting the light source beam onto the second color section; and
   if the second difference is greater than the second threshold, using the light source to project the light source beam onto the second color section at a fourth intensity, and operating the DMD at a fourth duty cycle when the light source is projecting the light source beam onto the second color section;
   wherein the fourth duty cycle is different from the third duty cycle or the fourth intensity is different from the third intensity.

7. The method of claim 6 wherein:
   if the third duty cycle has not reached 100%, the fourth duty cycle is different from the third duty cycle, and the fourth intensity is same as the third intensity; or
   if the third duty cycle has reached 100%, the fourth duty cycle is same as the third duty cycle, and the fourth intensity is different from the third intensity.

8. The method of claim 1, wherein each of the color sections comprises a plurality of color subsections, and the method further comprises:
   projecting the light source beam onto a specific color subsection of the phosphor wheel in different periods, wherein various intensities of the light source beam are used in the different periods;
   generating a plurality of transform rates of the specific color subsection associated with the various intensities by sensing stimulated brightness of the specific subsection when the light source beam is projected onto the specific color subsection with the various intensities in the different periods; and
   establishing a lookup table to record the plurality of transform rates of the specific color subsection.

9. The method of claim 8, wherein generating first real brightness of the light beam comprises:
   generating the first real brightness according to an equation $y=\Sigma_{i=1}^{M} t_i(a_i) \times p_i$ and obtaining $t_i(a_i)$ from the lookup table, wherein y is the first real brightness, i represents a current color subsection stimulated by the light source beam, M is number of color subsections stimulated by the light source beam during the first duty cycle, $a_i$ is the first intensity, $t_i(a_i)$ is a transform rate of the current color subsection when the light source beam with the first intensity is projected onto the current color subsection, and $p_i$ is a time duration the light source is projecting the light source beam onto the current color subsection.

10. A method for projecting a light beam with a projector, the projector comprising a light source, a phosphor wheel and a digital mirror device (DMD), the phosphor wheel having a plurality of color sections, and each of the color sections having a plurality of color subsections, the method comprising:

the light source projecting a light source beam onto M color subsections of a first color section of the plurality of color sections when the DMD is operated at a first duty cycle, wherein M is a positive integer;

generating first real brightness of the light beam according to an equation $y_1=\Sigma_{i=1}^{M} t_i(a_i) \times p_i$, wherein $y_1$ is the first real brightness, i is an integer ranged from 1 to M, $a_i$ is an intensity of the light source beam projected onto an $i^{th}$ color subsection of the M first color subsections, $t_i(a_i)$ is a transform rate of the $i^{th}$ color subsection when the light source beam with the intensity $a_i$ is projected onto the $i^{th}$ color subsection, and $p_i$ is a time duration the light source projects the light source beam onto the $i^{th}$ color subsection;

determining whether a first difference between the first real brightness and first target brightness of the light beam is less than a first threshold; and if the first difference is less than the first threshold, continuing to operate the DMD at the first duty cycle when the light source is projecting the light source beam onto the first color section, and continuing to use the light source to project the light source beam onto the $i^{th}$ color subsection at the intensity $a_i$.

11. The method of claim 10 further comprising:

if the first difference is greater than the first threshold, operating the DMD at a second duty cycle when the light source is projecting the light source beam onto the first color section, and using the light source to project the light source beam onto the $i^{th}$ color subsection at an intensity $b_i$;

wherein the second duty cycle is different from the first duty cycle or the intensity $b_i$ is different from the intensity $a_i$.

12. The method of claim 10 further comprising:

if the projector has not reached white balance and the first target brightness has reached first maximum brightness of the light beam corresponding to the first color section, operating the DMD at a fourth duty cycle when the light source is projecting the light source beam onto a second color section of the plurality of color sections, and using the light source to project the light source beam onto a $j^{th}$ color subsection of the second color section at an intensity $b_j$, wherein j is a positive integer;

wherein the fourth duty cycle is different from a third duty cycle used to operate the DMD when the light source is projecting the light source beam onto the second color section in a previous period or the intensity $b_j$ is different from an intensity $a_j$ of the light source beam projected by the light source onto the $j^{th}$ color subsection in the previous period.

13. The method of claim 10, wherein:

if the first duty cycle has not reached 100%, the second duty cycle is different from the first duty cycle, and the intensity $b_i$ is same as the intensity $a_i$; or if the first duty cycle has reached 100%, the second duty cycle is same as the first duty cycle, and the intensity $b_1$ is different from the intensity $a_i$.

14. The method of claim 10 further comprising:

the light source projecting the light source beam onto N second color subsections of a second color section of the plurality of color sections when the DMD is operated at a second duty cycle, wherein N is a positive integer;

generating second real brightness of the light beam according to an equation $y_2=\Sigma_{k=1}^{N} t_k(a_k) \times p_k$, wherein $y_2$ is the second real brightness, k is an integer ranged from 1 to N, $a_k$ is an intensity of the light source beam projected onto an $k^{th}$ second color subsection of the N second color subsections, $t_k(a_k)$ is a transform rate of the $k^{th}$ second color subsection when the light source beam with the intensity $a_k$ is projected onto the $k^{th}$ second color subsection, and $p_k$ is a time duration the light source projects the light source beam onto the $k^{th}$ second color subsection;

determining whether a second difference between the second real brightness and second target brightness of the light beam is less than a second threshold;

if the second difference is less than the second threshold, continuing to operate the DMD at the third duty cycle when the light source is projecting the light source beam onto the second color section, and continuing to use the light source to project the light source beam onto the $k^{th}$ second color subsection at the intensity $a_k$; and if the second difference is greater than the second threshold, operating the DMD at a fourth duty cycle when the light source is projecting the light source beam onto the second color section, and using the light source to project the light source beam onto the $k^{th}$ second color subsection at an intensity $b_k$;

wherein the fourth duty cycle is different from the third duty cycle or the intensity $b_k$ is different from the intensity $a_k$.

15. The method of claim 10 further comprising:

obtaining the transform rate $t_i(a_i)$ from a lookup table.

16. The method of claim 15 further comprising:

generating new transform rates of P color subsections of the first color section by sensing stimulated brightness of the P color subsections when the light source projects the light source beam with a first intensity onto the P color subsections, wherein P is a positive integer;

determining whether a first ratio of P and Q is greater than a predetermined ratio, wherein Q is number of all subsections of the first color section;

if the first ratio is greater than the predetermined ratio, generating speculative transform rates of (Q-P) color subsections of the first color section according to the new transform rates of the P color subsections, wherein the (Q-P) color subsections are color subsections of the first color section other than the P color subsections; and updating the lookup table according to the new transform rates of the P color subsections and the speculative transform rates of the (Q-P) color subsections.

17. The method of claim 16 further comprising:

generating new transform rates of R color subsections of a second color section of the plurality of color sections of the phosphor wheel by sensing stimulated brightness of the R color subsections when the light source projects the light source beam with the first intensity onto the R color subsections, wherein R is a positive integer;

determining whether a second ratio of R and S is greater than the predetermined ratio, wherein S is number of all subsections of the second color section; and if the second ratio is greater than the predetermined ratio, generating speculative transform rates of (S-R) color subsections of the second color section according to the new transform rates of the R color subsections, wherein the (S-R) color subsections are color subsections of the second color section other than the R color subsections;

wherein updating the lookup table according to the new transform rates of the P color subsections and the speculative transform rates of the (Q-P) color subsections comprises:
updating the lookup table according to the new transform rates of the P color subsections, the speculative transform rates of the (Q-P) color subsections, the new transform rates of the R color subsections, and the speculative transform rates of (S-R) color subsections.

18. The method of claim 17 further comprising:
generating new transform rates of T color subsections of a third color section of the plurality of color sections of the phosphor wheel by sensing stimulated brightness of the T color subsections when the light source projects the light source beam with the first intensity onto the T color subsections, wherein T is a positive integer;
determining whether a third ratio of T and U is greater than the predetermined ratio, wherein U is number of all subsections of the third color section; and
if the third ratio is greater than the predetermined ratio, generating speculative transform rates of (U-T) color subsections of the third color section according to the new transform rates of the T color subsections, wherein the (U-T) color subsections are color subsections of the third color section other than the T color subsections;
wherein updating the lookup table according to the new transform rates of the P color subsections and the speculative transform rates of the (Q-P) color subsections comprises:
updating the lookup table according to the new transform rates of the P color subsections, the speculative transform rates of the (Q-P) color subsections, the new transform rates of the R color subsections, the speculative transform rates of (S-R) color subsections, the new transform rates of the T color subsections, and the speculative transform rates of (U-T) color subsections.

19. The method of claim 16, wherein determining whether the first ratio of P and Q is greater than the predetermined ratio only when it has been determined that a difference between each new transform rate of P color subsections and a corresponding current transform rate recorded in the lookup table is greater than a predetermined value.

20. The method of claim 16, wherein a speculative transform rate of each color subsection of the (Q-P) color subsections is generated according to the new transform rates of at least two color subsections of the P color subsections.

21. The method of claim 20, wherein each color subsection of the at least two color subsections has a weighting, the weighting is negatively correlated with an angle between the each color subsection of the at least two color subsections and the each color subsection of the (Q-P) color subsections, and the speculative transform rate of the each color subsection of the (Q-P) color subsections is generated according to the weighting of the each color subsection of the at least two color subsections in additional to the new transform rates of the at least two color subsections of the P color subsections.

22. A projector, comprising:
a light source;
a phosphor wheel, comprising a first color section having a plurality of first color subsections;
a control unit, coupled to the light source to control the light source to project a light source beam onto the first color subsections with a first intensity;
a light sensor, coupled to the control unit and configured to sense first stimulated brightness of some of the first color subsections when the light source is projecting the light source beam onto the first color subsections with the first intensity; and
a storage unit, coupled to the control unit and configured to store a lookup table;
wherein the control unit generates a plurality of first transform rates associated with the first intensity according to the first stimulated brightness of some of the first color subsections, and the control unit controls the storage unit to record the first transform rates in the lookup table.

23. The projector of claim 22, wherein the phosphor wheel further comprises a second color section having a plurality of second color subsections, the control unit further controls the light source to project the light source beam onto the second color subsections with the first intensity, the light sensor senses second stimulated brightness of some of the second color subsections when the light source is projecting the light source beam onto the second color subsections with the first intensity, the control unit generates a plurality of second transform rates associated with the first intensity according to the second stimulated brightness of some of the second color subsections, and the control unit controls the storage unit to record the second transform rates in the lookup table.

24. The projector of claim 22, wherein the control unit further controls the light source to project the light source beam onto the first color subsections with a second intensity, the light sensor senses third stimulated brightness of some of the first color subsections when the light source is projecting the light source beam onto the first color subsections with the second intensity, the control unit generates a plurality of third transform rates associated with the second intensity according to the third stimulated brightness of some of the first color subsections, and the control unit controls the storage unit to record the third transform rates in the lookup table.

25. A method for projecting a light beam with a projector, the projector comprising a light source, a phosphor wheel and a digital mirror device (DMD), the phosphor wheel having a plurality of color sections, the method comprising:
the light source projecting a light source beam with a first intensity onto a first color section of the plurality of color sections when the DMD is operated at a first duty cycle;
generating first real brightness of the light beam;
determining whether a first difference between the first real brightness and first target brightness of the light beam is less than a first threshold;
if the first difference is less than the first threshold, continuing to operate the DMD at the first duty cycle and to use the light source to project the light source beam onto the phosphor wheel at the first intensity when the light source is projecting the light source beam onto the first color section; and
if the first difference is greater than the first threshold, using the light source to project the light source beam onto the first color section at a second intensity, and operating the DMD at a second duty cycle when the light source is projecting the light source beam onto the first color section;
wherein the second duty cycle is different from the first duty cycle and the second intensity is different from the first intensity.

* * * * *